(12) United States Patent
Schriener et al.

(10) Patent No.: US 6,350,495 B1
(45) Date of Patent: Feb. 26, 2002

(54) ELECTROSTATICALLY APPLICABLE COATING POWDER AND PROCESSES THEREFOR

(75) Inventors: Andreas Schriener, Bad Homburg; Herbert Triptrap, Frankfurt, both of (DE); Philip Robert Jackson, Stoke-on-Trent (GB); Steven Charles Withington, Stoke-on-Trent (GB); David Shingler, Stoke-on-Trent (GB)

(73) Assignee: dmc2 Degussa Metals Catalysts Cerdec AG, Frankfurt am Main (DE)

( * ) Notice: Subject to any disclaimer, the term of this patent is extended or adjusted under 35 U.S.C. 154(b) by 0 days.

(21) Appl. No.: 09/446,706
(22) PCT Filed: May 29, 1998
(86) PCT No.: PCT/EP98/03222
§ 371 Date: Mar. 15, 2000
§ 102(e) Date: Mar. 15, 2000
(87) PCT Pub. No.: WO98/58889
PCT Pub. Date: Dec. 30, 1998

(30) Foreign Application Priority Data

Jun. 24, 1997 (DE) ......................... 197 26 778

(51) Int. Cl.⁷ ............................. B05D 1/04; C04B 14/04
(52) U.S. Cl. ...................... 427/475; 427/486; 106/491; 501/16
(58) Field of Search ................................ 427/459, 461, 427/470, 475, 486, 477–481; 361/225–227; 501/16, 17, 21; 106/491

(56) References Cited

U.S. PATENT DOCUMENTS 4,908,225 A  *  3/1990  Niimura et al.
4,979,686 A  * 12/1990  Szegvari et al.

FOREIGN PATENT DOCUMENTS

| DE | 195 31 170 |   | 11/1996 |
| EP | 0453897    | * | 10/1991 |
| EP | 0 453 897  |   | 10/1991 |
| EP | 0 599 106  |   | 6/1994  |
| EP | 0 658 523  |   | 6/1995  |
| EP | 0 700 878  | * | 3/1996  |
| WO | 94/11446   | * | 5/1994  |
| WO | 94/26679   | * | 5/1994  |

* cited by examiner

*Primary Examiner*—Fred J. Parker
(74) *Attorney, Agent, or Firm*—Wenderoth, Lind & Ponack, L.L.P.

(57) ABSTRACT

Hitherto, glazing defects have arisen during glazing of ceramic substrates with an electrostatically applicable coating powder. This problem is solved by the coating powder $CP_{AB}$ and the coating method. The electrostatically applicable coating powder $CP_{AB}$ contains 1 to 50 wt. % of a glass-forming composition A which begins softening at 400 to 750° C. and 99 to 50 wt. % of a glass-forming composition B which begins to soften above 750–1,100° C. Preferably, the coating powder consists of 2.5 to 25 wt. % A, 75 to 97.5 wt. % B and 0 to 20 wt. %, specially 2 to 10 wt. % of thermally or chemically activatable adhesive agents. The coating powder $CP_{AB}$ is electrostatically applied as a single powder. Alternately, coating can be applied in two layers, wherein the $CP_U$ powder contains at least 5 wt. % of glass-forming composition A as a lower layer and the powder $CP_O$ contains at least 50 wt. % of glass-forming composition B as an upper layer.

29 Claims, No Drawings

ELECTROSTATICALLY APPLICABLE COATING POWDER AND PROCESSES THEREFOR

BACKGROUND OF THE INVENTION

This invention relates to a process for the production of ceramic and vitreous coatings, in particular glazes and engobes, comprising electrostatic application of a coating powder onto a ceramic substrate and firing of the coated substrate. The invention furthermore relates to a coating powder particularly suitable for the performance of the process and to the use thereof.

Ceramic and vitreous coatings, such as engobes and glazes, on ceramic, in particular unfired or partially fired, substrates are predominantly produced using aqueous slips. After application of the slip, the substrate coated therewith is fired, wherein the stovable material contained in the slip melts or sinters together to yield a ceramic or vitreous layer. Due to the disadvantages associated with the use of aqueous slips, such as effluent problems and elevated energy consumption, electrostatic powder coating of ceramic products is becoming increasingly significant.

Providing ceramic substrates, such as porcelain, earthenware and stoneware, but in particular unfired or only partially fired substrates, with an electrostatic coating still occasions various problems with regard to electrostatic application of the coating powder, inadequate adhesion of the powder to the substrate and, often, inadequate handling resistance. In addition to these problems, there are glazing defects which only occur on firing.

Various approaches have been used to solving the electrostatic and adhesion problems: thus, according to DE-PS 29 41 026, glaze powder may be adjusted to a specific surface resistance value suitable for electrostatic application of greater than $1 \cdot 10^{10}$ Ohm·m by coating with a polysiloxane. Engobes may also be applied electrostatically as powders after such hydrophobing treatment (EP-A 0 442 109). While, according to DE-A 42 39 541, the adhesion of an electrostatically applied glaze powder may indeed be improved by initially applying an aqueous coupling layer containing a polymer and a glass frit onto the substrate, the use of an aqueous system is regarded as disadvantageous.

WO 94/26679 discloses an improvement to the adhesion and handling resistance of a stovable coating powder, such as a glaze powder, which has been electrostatically applied to a substrate: in this case, the coating powder contains, apart from a glaze powder, a chemically or physically activatable coupling agent which combusts without leaving a residue on firing, such as polyolefins and dextrins, by means of which, after activation, the particles of the layer are fixed to each other and to the substrate. Preferred coating powders contain polysiloxane-coated glass frits mixed with to 15 wt. % of thermoplastic or 5 to 10 wt. % of dextrin. Usable glazes may be obtained on porcelain biscuit bodies only under specially optimised conditions, which, however, entail increased costs. If the conditions are only slightly modified, depending upon the substrate, sometimes considerable glaze defects and deficiencies occur before the required layer thickness is obtained.

WO 97/08115 discloses a remedy to the above-stated problems: the production process may be simplified without degrading glaze quality by using a glaze or engobe composition having a particular grain size distribution, namely a $d_{50}$ value of 5 to 25 µm, a $d_{90}$ value of less than 35 µm and a $d_{10}$ value of greater than or equal to 2 µm, in a coating powder additionally containing a coupling agent.

While the two above-mentioned processes do allow the production of defect-free glazes on fired or biscuit-fired porcelain bodies, when the same methods are used to produce glazes and engobes on unfired bodies, such as wall and floor tiles, the stoved coating exhibits considerable deficiencies in quality. In the case of biscuit-fired bodies too, the frequency of glaze defects is often excessively high. The defects often take the form of large, "frozen-in" blisters and extensive areas without glaze (the occurrence of such defects is also known as "crawling"). These defects often occupy 10 to 30% of the stated area. The cause of this defect is suspected to involve the following interactions: the electrostatically applied layer is much looser and moreover exhibits much lower adhesion to the substrate than the layer obtained when a conventional slip is used. During firing of a green body provided with a glaze layer, gas-forming reactions occur in the green body, in the boundary layer between the body and the glaze layer and in the glaze layer, such reactions including, for example, the conversion of kaolin into metakaolin, which in particular proceeds at a temperature in the range from approx. 700 to 800° C., and the elimination of $CO_2$ from carbonates, such as dolomite, present in the body, which occurs at around 900° C. If the layer is too thin and adheres inadequately, it is labile from when an initially present organic binder has combusted during the firing until the temperature at which the glaze melts, such that it may be destroyed by slight mechanical action, such as vibration and air currents in the kiln and by degassing processes in the body. One of these disruptions is manifested by lifting of an area of the electrostatically applied layer, so resulting in the formation of blisters and glaze-free areas once the blisters have burst. Clearly, the capillary forces which occur when a slip is applied using conventional methods firmly anchor the layer to the green body, such that the stated disruptions do not occur, whereas such anchoring is absent when the layer is applied electrostatically.

SUMMARY OF THE INVENTION

The object of the present invention is accordingly to overcome the stated problems in the production of ceramic and vitreous coatings, in particular glazes, wherein the coating powders are applied electrostatically. Once fired, the coatings may contain crystalline and/or amorphous fractions.

A process has been found for the production of a ceramic and/or vitreous coating, in particular a glaze, on a ceramic substrate, comprising electrostatic application of a coating powder and firing of the coated substrate, which process is characterised in that a coating powder $CP_{AB}$ is used which contains 1 to 50 wt. % of a layer-forming composition A having a softening onset in the range from 400 to 750° C. and 99 to 50 wt. % of a layer-forming composition B having a softening onset in the range from above 750 to 1100° C., or in that an underlayer is applied onto the ceramic substrate using a coating powder $CP_U$ containing at least 5 wt. % of the layer-forming composition A and an upper layer is applied thereon using a coating powder $CP_O$ containing at least 50 wt. % of the layer-forming composition B, wherein at least one of the two layers is applied electrostatically and the underlayer constitutes at least 1% of the total coating. The term "layer-forming" is taken to mean that, on firing, the composition is capable of forming a layer of a crystalline and/or amorphous, i.e. ceramic and/or vitreous, material.

The essence of the invention is the use of a layer-forming composition A, which has a softening onset $T(EB)_A$ below the softening onset $T(EB)_B$ of a layer-forming composition B, wherein composition B constitutes the majority of the ceramic coating to be produced. The layer-forming composition A preferably comprises a low-melting glass composition. The majority of the coating comprises compositions as are used for glazing, engobing and otherwise decorating ceramic substrates. According to the invention, the ceramic substrates to be coated in particular comprise those in which or at the boundary layer of which with the applied coating degassing processes occur during firing; such substrates include unfired or biscuit-fired earthenware and stoneware as well as unfired and biscuit-fired porcelain. Unfired wall and floor tiles and roofing tiles are particularly suitable substrates. Composition A is either a constituent in an effective quantity of the coating powder $CP_{AB}$ directly applied as a single layer or a constituent in an effective quantity of a coating powder $CP_U$ for a lower layer, over which an upper layer of a coating powder $CP_O$ of a different composition is applied.

The function of composition A is considered to be that it :effects good adhesion of the coating to the substrate during the stoving operation. Composition A is here selected such that its softening onset is preferably below the temperature at which degassing processes occur within the substrate, at the boundary layer and within the coating. Since composition A melts before the said degassing processes occur, in the case of the single-layer structure preferred according to the invention using the coating powder $CP_{AB}$, both good adhesion to the substrate and good cohesion of the coating itself are effected during firing. Blistering, displacement of the entire layer, for example due to vibration in a sliding-bat kiln, or blowing off in a stationary kiln operated by firing are thus avoided. If the optimum composition and quantity to be used are selected, the area of crawling (=total area of defects) may be reduced to zero. Degassing from the substrate may proceed in part through the reverse side thereof and/or through the sintered coating.

In the alternative two-layer structure, the lower layer effects adhesion to the substrate. Even if the lower layer is much thinner than the upper layer arranged thereon, crawling is avoided during firing. The thickness of the lower layer is at least 1% and generally less than 50%, in particular 2 to 30%, of the total thickness of the two layers. Applying a low-melting glass flux as a thin lower layer has the advantage that the properties of the upper layers which are vital for service are much less affected.

After firing, the total thickness of the single or two-layer ceramic and/or vitreous coating is within the conventional limits known from the prior art, for example from glazing and engobing using aqueous slips, i.e. usually in the range from 50 to 1000 $\mu$m, in particular from 100 to 500 $\mu$m, and in the case of glazes particularly preferably in the range from 200 to 300 $\mu$m.

While the chemical composition of the layer-forming composition A, which in both alternative embodiments is a constituent of the layer in contact with the ceramic substrate, does substantially determine the softening onset and the course of melting, determined as T(EB) and T(HK) (=hemisphere point) under a heating microscope, it is, however, of little significance to the final result of the single or two-layer coating. Composition A may assume the form of a glass frit or of a pulverulent mixture of substances, which begins to soften at T(EB) to form glass. Glass frits are preferred. When a mixture of substances is used, it conveniently assumes the form of a previously homogenised and spray-pelletised powder. It is known that low softening point glasses, which are also known as fluxes in decorative applications, are characterized by elevated contents of oxides from the range comprising PbO, $Bi_2O_3$, ZnO, $B_2O_3$ and alkali metal oxides. Where an unfritted composition A is used, it may consist of one or more substances from the range comprising alkali metal borates, alkali metal silicates, lead borosilicates, bismuth borosilicates and zinc borosilicates. 80 to 100 wt. % of composition A, relative to the glass-forming components, preferably assume the form of a glass frit.

Composition A is conveniently used in ultra-finely ground form. Effective action is then achieved at a low usage rate if the grain size range is substantially finer than that of the layer-forming composition B. The $d_{50}$ value of composition A is preferably in the range from 1 to 5 $\mu$m and the $d_{90}$ value is below the $d_{50}$ value of composition B.

The softening onset of the composition A to be used is usually in the range from 400 to 750° C., in particular in the range from 450 to 600° C. A softening onset of around 500° C. is particularly preferred, because it is then ensured that, on firing, once an organic coupling agent which is additionally present in the coating powder and is initially responsible for good adhesion and handling resistance of the layer has combusted, the layer-forming composition A exerts its action.

Layer-forming composition B comprises such a composition which begins to soften at around/above 750° C., preferably at 800 to 1050° C. and in particular in the range from 900 to 1000° C. Composition B should not begin to soften until composition A has melted to such an extent that the required adhesion to the substrate and within the coating containing composition B has come into effect. The chemical composition of composition B corresponds to that as is conventional for coatings of this generic type, such as in particular glazes and engobes. The person skilled in the art is familiar with such compositions; reference is made by way of example to *Ullmann's Encyclopedia of Industrial Chemistry*, $5^{th}$ edition, 1986, pp. 31–33. Glazes which are used according to the invention preferably comprise systems, the majority of which assumes the form of a glass frit, but a smaller proportion of which, namely up to 30 wt. %, preferably up to 10 wt. %, may be present in the form of further components, such as clay minerals, such as kaolin, and/or nepheline syenite. Such systems are in particular suitable for so-called rapid single firing glazes, as are used for glazing wall tiles, which are fired at approximately 1100° C. (±50° C.). Glazes for floor tiles are more strongly formulated to a T(EB) of around/above 900° C. and a firing temperature of around 1200° C. Such glazes conventionally contain a smaller proportion of glass frits; example compositions substantially contain (wt. %) 30 to 50% glass frit, 5 to 15% wollastonite (Ca silicate), 5 to 15% alumina ($Al_2O_3$), 0 to 15% zirconium silicate, 5 to 15% kaolin plus colouring pigments if required. Glazes based on the above-stated mixtures of substances are conveniently used in the form of sprayed pellets.

The substantial constituents of engobes are glass frits, finely divided ceramic raw materials, ground minerals, glass and porcelain flour, together with opacifiers and/or pigments. In this case too, it is convenient to use spray-dried pellets because segregation is avoided and uniform melting behaviour is achieved.

Composition B preferably consists of 30 to 100 wt. % of one or more glass frits.

According to a preferred embodiment, both the coating powder $CP_{AB}$ to be sprayed for the single layer coating and the powders $CP_O$ and optionally also CP, to be used for the two-layer coating, have a grain size range as disclosed in WO 97/08115 of $d_{50}$ 5 to 25 $\mu$m, $d_{10} \geq 2$ $\mu$m and $d_{90}$ less than 35 $\mu$m.

The powder of both composition A and B or of the mixture containing A and B may, where required for electrostatic reasons, have a known hydrophobing outer coat, for example a polysiloxane outer coat.

The coating powder $CP_{AB}$ to be used for the single layer coating contains 1 to 50 wt. % of composition A and 50 to 99 wt. % of a composition B. Preferably, however, $CP_{AB}$ contains 2.5 to 25 wt. % of A and 97.5 to 75 wt. % of B, in each case relative to all the ceramic and/or vitreous layer-forming components. Coating powder $CP_{AB}$ preferably contains a total of 75 to 95 wt. %, in particular 90 to 95 wt. % of ceramic and/or vitreous layer-forming components; where $CP_{AB}$ contains relatively large quantities of colouring pigments, the total of A and B may be still lower. Compositions A and B may each contain two or more glass frits, the T(EB) values of which are within the claimed range. An excessively large proportion of A in $CP_{AB}$ with an excessively low $T(EB)_A$ should be avoided because an undulating surface and/or pinholing of the glaze may occur. The person skilled in the art will perform initial investigatory testing to determine the blend of composition B with composition A with regard to $T(EB)_A$ and the quantity of A relative to B which is most suitable for obtaining a defect-free glaze or engobe or decoration.

For the purposes of two-layer coating, the lower layer may have a composition similar to that of $CP_{AB}$ but with at most 5 wt. % of composition A and up to 95 wt. % of composition B. Alternatively, the lower layer may contain exclusively a composition according to A. In this case, the layer thickness of the lower layer should, if at all possible, constitute no more than 10% of the total thickness of both layers. The upper layer contains a layer-forming composition B as the main component ($\geqq 50\%$) of the coating powder $CP_O$. Coating powder $CP_O$ may, however, also contain a composition A, specifically in a smaller quantity than it is present in $CP_U$.

It is known that electrostatically applicable coating powders, preferably glazes, may, apart from ceramic and/or vitreous layer-forming components, also contain one or more chemically or physically, in particular thermally, activated coupling agents. This is also the case for the process according to the invention and for the coating powders to be used for this purpose, such that these preferably contain an effective quantity of such coupling agents. Such materials which may be used are, for example, thermoplastics and chemically curing reaction resins and moisture-activatable substances. Explicit reference is hereby made to WO 94/26679 and WO 97/08115 with regard to the selection of materials, the quantity to be used and the function of the coupling agents. Suitable coupling agents which are activatable by thermal treatment are thermoplastic homo- and copolymers having a softening point in the range between 60 and 250° C., preferably between 80 and 200° C. and in particular between 80 and 150° C. The thermoplastic coupling agents preferably comprise polyolefins, such as paraffin wax and low density polyethylene (LDPE), together with acrylate and methacrylate polymers and copolymers, polyvinyl compounds, such as polystyrene, polyvinyl acetate, ethylene/vinyl acetate copolymers, styrene/acrylate copolymers; polyesters and copolyesters as well as polyamides and copolyamides are also usable.

According to another embodiment, hydrophilic and hydrophobic polymers are combined together as thermally activatable coupling agents in such a manner that the glaze powder optionally still containing residual moisture and/or the substrate to be glazed are reliably wetted. Hydrophilic polymers exhibit structural elements which are capable of forming hydrogen bridges, for example hydroxyl groups, carboxyl groups and/or ether bridges.

It is advantageous if the diameter of the particles of the coupling agent(s) used in the coating powder is within the particle size range of the stovable compositions. The average particle diameter $d_{50}$ of the coupling agent is particularly preferably below the $d_{50}$ value of the stovable compositions. A narrow grain size range and moreover a spherical grain habit of the coupling agent are particularly preferred.

Chemical activation comprises, for example, polymerisation, such as crosslinking in the presence of a polyfunctional acrylate or methacrylate, or a polyaddition or polycondensation reaction of two-component systems. Physical activation preferably comprises partial melting of the coupling agent with subsequent cooling and solidification. This type of activation may be effected by heating the substrate to be coated before, during or after electrostatic coating and may proceed using conventional ovens or irradiation with infra-red light sources.

It has been found that a coating powder containing one or more stovable compositions and one or more coupling agents from the range comprising polyolefins, in particular polyethylene, should conveniently be applied electrostatically within approximately one day of the production thereof in a high intensity mixing or grinding unit, in order to avoid possible ageing-related disadvantages.

It has been found that, with regard to obtaining defect-free stoved coatings, it is particularly advantageous to incorporate the coupling agent into the layer-forming powder by means of an intensive mixing or grinding process. The temperature occurring during incorporation must be below the activation temperature of a coupling agent activatable by melting or a chemical reaction. Particularly advantageously usable intensive mixing and grinding units contain a high speed rotating beater, which is operated at a rotational speed in the range from 2000 to 20000 rpm, in particular at approximately 5000 to 15000 rpm. The stated measure of incorporating one or more coupling agents into a coating powder containing one or more stovable layer-forming compositions by means of a, high intensity mixer or high intensity mill is advantageous for any coating powders which are to be applied electrostatically, i.e. also those which are applied onto glass or fired ceramic substrates or metal. A high intensity mill from the range comprising beater and jet mills is preferably used for this purpose. The rotational speed of the beater mills, such as a pin mill or pin beater mill, should be as high as possible during mixing. The rotational speed will usually be in the range from 2000 to 20000 rpm (revolutions per minute), particularly 5000 to 15000 rpm.

According to a preferred embodiment, coupling agents having a narrow grain size range are used for the production of coating powders containing coupling agents, for example polyethylene wax having a grain size range of substantially 1 to 20 µm, in particular approximately 5 to approximately 10 µm, for 90% of the powder.

The coating powders $CP_{AB}$ and $CP_O$ and/or $CP_U$ may additionally contain pigments which are stable under the firing conditions. Pigment content will not generally exceed 20 wt. %. Coloured coatings may also be obtained by using coloured frits.

The coating powders $CP_{AB}$, $CP_O$ and $CP_U$ may additionally contain auxiliaries in a quantity of generally up to 5 wt. %, but usually only of up to 2 wt. %, for the purposes of trouble-free processing. Examples are fluidising auxiliaries. Fluidising auxiliaries in particular comprise pyrogenically produced oxides, which may in turn be hydrophobed Suitable fluidising agents are, for example, silica, titanium dioxide and aluminum oxide and $ZrO_2$. Prior art coating powders often contain such fluidising auxiliaries in a quantity of between 0.5 and 3 wt. %; preferred coating powders according to the invention contain 0 to 0.3 wt. %, in particular 0 to 0.2 wt. %, of fluidising agent, for example pyrogenic $SiO_2$ (AEROSIL® from Degussa AG), relative to stovable material.

Further auxiliaries optionally present in the coating powders are those with which the electrical properties of the powders may be modified in such a manner that their specific electrical resistance permits trouble-free electrostatic spraying. Examples of such auxiliaries are hydrophobing agents. The specific electrical resistance of the coating powders should generally be within the range from approximately $10^9$ to approximately $10^{14}$ Ohm·m.

Application of the coating in one or two layers by electrostatic spraying proceeds in a manner known per se using a high voltage gun operating in accordance with the corona or super-corona principle. Voltage is conventionally to 100 kV, in particular 40 to 80 kV, the current 40 to 80 $\mu$A.

According to a preferred embodiment of the process, the substrate to be coated is preheated before spraying, conveniently to 100 to 250° C., because, as disclosed in WO 97/08115, this improves the adhesion of the powder to the substrate and so facilitates handling of the unfired coated substrate. Pretreating the substrate with a salt according to WO 94/26679 is also possible.

The coated substrate is fired in a conventional manner in known kilns. The firing temperature is determined by the composition of the unfired or biscuit-fired substrate and of the coating, but is conventionally in the range above approximately 900° C. up to approximately 1450° C., usually 1000 to 1300° C.

The present invention also provides an electrostatically applicable coating powder $CP_{AB}$ comprising a composition which forms a layer on ceramic firing, which powder is characterized in that it contains from 1 to 50 wt. % of a layer-forming composition A having a softening onset in the range from 400 to 750° C. and 99 to 50 wt. % of a layer-forming composition B having a softening onset in the range from above 750 to 1100° C. The coating powder $CP_{AB}$ preferably contains 2.5 to 25 wt. % of a layer-forming composition A and 75 to 97.5 wt. % of a layer-forming composition B, in each case relative to layer-forming components, i.e. the sum of A and B. A particularly preferred coating powder substantially consists of 75 to 95 wt. % of a composition B, 3 to 10 wt. % of a composition A, 2 to 10 wt. % of a thermally or chemically activatable organic polymer, 0 to 2 wt. % of fluidising agents and auxiliaries to establish the specific surface resistance, such as a carboxylic acid salt. The layer-forming compositions A and B in the coating powder $CP_{AB}$ preferably exhibit a $d_{10}$ value of 5 to 25 $\mu$m, a $d_{90}$ value of less than 35 $\mu$m and a $d_{10}$ value of greater than or equal to 2 $\mu$m. The $d_{10}$, $d_{50}$ and $d_{90}$ values state the grain diameter at which 10%, 50% and 90% of the grains pass through (determined to DIN 66141, for example using the CILAS HR 850-B granulometer).

By applying the process according to the invention in the alternative embodiments and using the coating powder according to the invention for single layer coating, it is possible to glaze, engobe or decorate unfired and biscuit-fired substrates without the hitherto obtained extensive areas of glaze defects occurring on firing. The coating powder $CP_{AB}$ may be produced in a simple manner by intensive mixing of the constituents. Selection of the constituents occasions no problems because they comprise raw materials or intermediates, such as in particular glass frits, conventional in the ceramics industry, as well as known auxiliaries. The coating powders according to the invention are particularly suitable for the production of glazed tiles using the rapid single firing process, wherein unfired tiles are coated electrostatically and then fired (Monoporora process).

DETAILED DESCRIPTION OF THE PREFERRED EMBODIMENTS

EXAMPLES (E) AND COMPARATIVE EXAMPLES (CE)

Coating powders were produced by intensive mixing of the components stated in Table 1 in an intensive mixing unit (Pulverisette 14 mill without screen attachment from the company Fritsch, Idar-Oberstein (DE)) at 12000 rpm in two passes.

TABLE 1

| Powder A | Glaze 32366/4 (= glass frit) : | 94% |
| --- | --- | --- |
| | Polyethylene wax (= coupling agent): | 5.8% |
| | Aerosil 200 (= fluidising agent): | 0.2% |
| Powder B 1 | Powder A + 1% flux TDF 5512a | |
| Powder B 2 | Powder A + 3% flux TDF 5512a | |
| Powder B 3 | Powder A + 5% flux TDF 5512a | |
| Powder B 4 | Powder A + 10% flux TDF 5512a | |
| Powder B 5 | Powder A + 5% flux RD 2002 | |
| Powder B 6 | Powder A + 5% flux 106053 | |
| Powder C | Engobe (79/507/A) - | |
| | Dry pellets: | 94% |
| | Polyethylene wax: | 5.8% |
| | Aerosil 200: | 0.2% |
| Powder D 1 | Powder C + 1% flux TDF 5512a | |
| Powder D 2 | Powder C + 3% flux TDF 5512a | |
| Powder D 3 | Powder C + 5% flux TDF 5512a | |
| Powder D 4 | Powder C + 10% flux TDF 5512a | |
| Powder D 5 | Powder C + 5% flux RD 2002 | |
| Powder D 6 | Powder C + 5% flux 106053 | |

The individual components are:

Glaze 32366/4: Glass frit 290/498 from Cerdec AG with optimised grain size distribution—$d_{10}$ 3.7 $\mu$m, $d_{50}$ 19.5 $\mu$m, $d_{90}$ 34.5 $\mu$m. The principal components of the frit are $SiO_2$, ZnO, CaO, MgO, $B_2O_3$, $Al_2O_3$, $ZrO_2$ and $K_2O$. Softening onset T(EB) 940° C., hemisphere temperature T(HK)=1080° C. (determined under a heating microscope).

Flux TDF 5512a: Glass frit based on $SiO_2$, $Bi_2O_3$, $Na_2O$, $K_2O$, $Li_2O$ and $Al_2O_3$; softening onset T(EB) 550° C., hemisphere point T(HK) 770° C., both values determined under a heating microscope. Grain size range $d_{10}$ 0.5 $\mu$m, $d_{50}$ 1.4 $\mu$m, $d_{90}$ 6.1 $\mu$m.

Flux RS 2002: Lead-free glass frit based on $SiO_2$, $Bi_2O_3$, ZnO, $B_2O_3$ and $Na_2O$ as the principal components. Softening onset T(EB) 550° C., hemisphere point T(HK) 680° C., in each case determined under a heating microscope.

Flux 106053: Glass frit based on $SiO_2$, ZnO, $B_2O_3$, $Na_2O$ as the principal components. T(EB) 510° C., T(HK) 620° C. (determined under a heating microscope). Grain size range $d_{10}$ 0.8 $\mu$m, $d_{50}$ 3.0 $\mu$m, $d_{90}$ 11.5 $\mu$m.

Polyethylene wax: Softening temperature 135° C.; grain size range $d_{10}$ 1.8 $\mu$m, $d_{50}$ 10.5 $\mu$m, $d_{90}$ 16.9 $\mu$m.

Coating: Green bodies (15×20 cm) for wall tiles (from the company Grohn). Spraying was performed in a coating booth. Some of the tiles were preheated to 180° C. for 30 minutes before coating, others were used without preheating, c.f. notes to Table 2. The high voltage gun was operated at 70 kV and 60 μA, the quantity of dispensing air and atomising air being adjusted such that throughput was 100 g of powder per minute.

Both single and two-layer coatings were applied—see Table 2. In the case of two-layer application, the tile provided with the underlayer was heated for 30 minutes to 180° C. once the underlayer had been applied in order to allow the application of a sufficient quantity of glaze as the upper layer.

Firing was performed using the rapid single firing process in a gas-fired chamber kiln at $T_{max}$=1150° C. with a total firing time of 48 minutes. After firing, the area of glaze defects (crawling), relative to the tile area, was determined on two or more tiles in each case.

TABLE 2a

Glaze - single layer
Powder application 21 g/tile

| No. | Powder | Crawling (%) |
|---|---|---|
| CE 1 | A | 20–30 |
| E 1 | B 1 | 10–20 *) |
| E 2 | B 2 | 5–10 *) |
| E 3 | B 3 | 0 **) |
| E 4 | B 4 | 0 **) |
| E 5 | B 5 | 0 **) |
| E 6 | B 6 | 0 **) |

*) Application in E 1 and E 2 onto cold bodies; on application onto bodies preheated to 180° C. for 30 minutes, the crawling value when powders B 1 and B 2 were used remained virtually unchanged.
**) Application in E 3 to E 6 onto bodies preheated to 180° C. for 30 minutes. In E 3, application was performed on tiles which had not been preheated, but it proved impossible to apply the entire required quantity of coating powder.

TABLE 2b

Glazes - two layers
Underlayer 5 g and upper layer 16 g/tile

| No. | Underlayer powder | Upper layer powder | Crawling (%) |
|---|---|---|---|
| E 7 | B 1 | A | 20–30 |
| E 8 | B 2 | A | 5–10 |
| E 9 | B 3 | A | 0 |
| E 10 | B 4 | A | 0 |

Note:
Once the underlayer had been applied, the tile was heated to 180° C. for 30 minutes and then the upper layer was applied electrostatically onto the heated, coated tile.

TABLE 2c

Engobes - single layer
8 g/tile

| No. | Powder | Crawling (%) |
|---|---|---|
| CE 2 | C | 20–30 |
| E 11 | D 1 | 10–20 |
| E 12 | D 2 | 0–5 |
| E 13 | D 3 | 0 |
| E 14 | D 4 | 0 |
| E 15 | D 5 | 0 |
| E 16 | D 6 | 0 |

Note:
Powder applied on green bodies which had not been preheated.

TABLE 2d

Engobes - two layers
2 g/tile in the underlayer and 6 g/tile in the upper layer

| No. | Powder | Powder | Crawling (%) |
|---|---|---|---|
| E 17 | D 1 | C | 10–20 |
| E 18 | D 2 | C | 0–5 |
| E 19 | D 3 | C | 0 |
| E 20 | D 4 | C | 0 |

Note:
Application without preheating the bodies

The Examples show that in both alternative embodiments of the invention crawling defects are distinctly decreased and finally fall to 0% in the presence of even a very small quantity of a composition A (=flux) in the coating powder, which is applied directly onto the substrate.

Using the production of the composition A coating powder by way of example, the influence of the mixing unit used was investigated: when the above-stated Pulverisette was used, the proportion of tiles exhibiting crawling was 30 to 40% at 8000 rpm and 2 passes, and 20 to 30% at 12000 rpm and 2 passes. When a plough bar mixer (Lödige mixer) was used, the proportion of tiles exhibiting crawling was 60 to 70% at a mixing time of 20 minutes and 40 to 50% at a mixing time of 50 minutes.

EXAMPLE E 21

A white zirconium frit (no. 997633) having a $T_{EB}$ of 1020° C. and flux frit (TDF 5512 A) having a $T_{EB}$ of 550° C. were each ground in a jet mill and the powders classified such that $d_{50}$ was 20 μm and no particles larger than 60 μm and smaller than 0.5 μm were present.

The classified frits were mixed in 95:5 ratio by weight. 4.75 wt. % of spherical polyethylene wax having a narrow grain size distribution (around 10 μm) and a molecular weight of 8700 and 0.2 wt. % of pyrogenic silica (Aerosil 200® from Degussa AG) were added to the mixture and coarsely mixed. The mixture was homogenised by two passes through a pin mill (Pulverisette) at 10000 rpm. The powder was sprayed onto unfired clay tiles (200×150 mm) using a super-corona electrostatic spray gun—70 kV, carrier air 0.5 bar, air flow rate 5 m³/h. 21 g of powder were sprayed on, then the sprayed tile was heated to 180° C. for 10 minutes. After cooling, the coating adhered firmly and resisted handling. Firing was performed for 40 minutes in a sliding-bat kiln at a peak temperature of 1150° C. The glaze on the tile was cohesive, defect-free and glossy.

What is claimed is:

1. A process for forming a coating on an unfired or biscuit-fired ceramic substrate, which comprises:
    coating electrostatically an unfired or biscuit-fired ceramic substrate with a coating powder, wherein the coating powder comprises 1 to 50% by weight of a ceramic or vitreous layer-forming composition A having a softening onset in a range of 400 to 750° C., and 50 to 99% by weight of a ceramic or vitreous layer-forming composition B having a softening onset in a range of above 750 to 1100° C., and
    firing the substrate at a temperature from above 900° C. to about 1,450° C.

2. The process according to claim 1, wherein the coating powder consists essentially of
    1 to 50% by weight of composition A, 50 to 99% by weight of composition B, 0 to 20% by weight of one or more chemically or thermally activatable coupling agents, 0 to 20% by weight of pigments, and 0 to 5% by weight of auxiliaries.

3. The process according to claim 1, wherein composition A comprises 80 to 100% by weight of one or more glass frits.

4. The process according to claim 1, wherein composition B comprises 30 to 100% by weight of one or more glass frits.

5. The process according to claim 1, wherein the coating powder comprises 2.5 to 25% by weight of composition A and 75 to 97.5% by weight of composition B, based on the total weight of composition A and composition B.

6. The process according to claim 1, wherein composition A has a softening onset in a range of 450 to 600° C., and composition B has a softening onset in a range of 800 to 1050° C.

7. The process according to claim 1, wherein the coating is a glaze or engobe.

8. The process according to claim 1, wherein the ceramic substrate is unfired or biscuit-fired earthenware or stoneware.

9. The process according to claim 1, wherein the composition A has a softening onset in the range of 500° C. to 750° C.

10. A process for forming a coating on an unfired or biscuit-fired ceramic substrate, which comprises:

coating an unfired or biscuit-fired ceramic substrate with an underlayer of a first coating powder comprising at least 5% by weight of a ceramic or vitreous layer-forming composition A having a softening onset in a range of 400 to 750° C., coating the ceramic substrate with an upper layer of a second coating powder comprising at least 50% by weight of a ceramic or vitreous layer-forming composition B having a softening onset in a range of above 750 to 1100° C., and firing the substrate, wherein at least one of the underlayer and the upper layer is applied electrostatically, and wherein the thickness of the underlayer is at least 1% by weight of the total underlayer and upper layer coatings.

11. The process according to claim 10, wherein composition A comprises 80 to 100% by weight of one or more glass frits.

12. The process according to claim 10, wherein composition B comprises 30 to 100% by weight of one or more glass frits.

13. The process according to claim 10, wherein composition A has a softening onset in a range of 450 to 600° C., and composition B has a softening onset in a range of 800 to 1050° C.

14. The process according to claim 10, wherein the coating is a glaze or engobe.

15. The process according to claim 10, wherein the ceramic substrate is unfired or biscuit-fired earthenware or stoneware.

16. The process according to claim 10, wherein both the underlayer and the upper layer coatings are applied electrostatically, and wherein the thickness of the underlayer is 2 to 30% by weight of the total underlayer and upper layer coatings.

17. An electrostatically applicable coating powder, comprising 2.5 to 25% by weight of a ceramic or vitreous layer-forming composition A having a softening onset in a range of 400 to 750° C., 75 to 97.5% by weight of a ceramic or vitreous layer-forming composition B having a softening onset in a range above 750 to 1100° C., and up to 20% by weight of one or more chemically or thermally activatable coupling agents.

18. The coating powder according to claim 17, wherein composition A and composition B exhibit a grain size distribution with a $d_{90}$ value of less than 35 μm, a $d_{50}$ value in a range of 5 to 25 μm, and a $d_{10}$ value greater than or equal to 2 μm.

19. The coating powder according to claim 17, wherein composition A comprises 80 to 100% by weight of one or more glass frits, and composition B comprises 30 to 100% by weight of one or more glass frits.

20. The coating powder according to claim 17, which further includes a hydrophilic and a hydrophobic polymer as a coupling agent.

21. The coating powder according to claim 17, wherein the coupling agent is a thermoplastic organic polymer.

22. The coating powder according to claim 21, wherein the thermoplastic organic polymer is polyethylene.

23. The coating powder according to claim 17, which further includes up to 5% by weight of one or more auxiliary.

24. The coating powder according to claim 23, wherein at least one auxiliary is a fluidizing auxiliary or an auxiliary for increasing specific electrical resistance.

25. The coating powder according to claim 23, which contains up to 3% by weight of pyrogenic silica as a fluidizing agent, or which contains up to 3% by weight of a salt of a carboxylic acid having 1 to 6 carbon atoms as an auxiliary for increasing specific electrical resistance, or which contains both.

26. The coating powder according to claim 25, wherein the carboxylic acid has 2 carbon atoms and is a Mg or Ca salt.

27. A process for producing the electrostatically applicable coating powder according to claim 17, which comprises mixing of the composition A, the composition B and the one or more coupling agents using an intensive mill selected from a beater and jet mill.

28. The process according to claim 27, wherein the mixing is performed using a pin or pin beater mill at a rotor speed of 2,000 to 20,000 rpm.

29. The process according to claim 28, wherein the rotor speed is 5,000 to 15,000 rpm.

* * * * *